United States Patent [19]

Terashima et al.

[11] Patent Number: 5,046,801
[45] Date of Patent: Sep. 10, 1991

[54] OPTICAL WAVEGUIDE HAVING LOW OPTICAL DAMAGE

[75] Inventors: Akira Terashima, Oume; Takumi Fujiwara, Nishitama; Hiroshi Mork, Oume; Takeshi Yokoyama, Kunitachi, all of Japan

[73] Assignee: Sumitomo Metal Mining Company Limited, Tokyo, Japan

[21] Appl. No.: 587,110

[22] Filed: Sep. 24, 1990

[30] Foreign Application Priority Data

Sep. 27, 1989 [JP] Japan ................................ 1-249244

[51] Int. Cl.$^5$ .............................................. G02B 6/10
[52] U.S. Cl. .................................... 385/130; 385/141
[58] Field of Search ............... 350/96.11, 96.12, 96.29, 350/96.34

[56] References Cited

U.S. PATENT DOCUMENTS 3,957,342  5/1976  Newns et al. .................. 350/96.34
4,783,136  11/1988  Elman et al. .................. 350/96.12

Primary Examiner—Frank Gonzalez
Attorney, Agent, or Firm—Watson, Cole, Grindle & Watson

[57] ABSTRACT

An optical waveguide produced from a lithium niobate single crystal substrate diffused thereon titanium is claimed, wherein, as the substrate is used a single crystal of lithium niobate having an optical absorbance coefficient of 0.03 cm$^{-1}$ or less for a light 420 nm in wavelength. The optical waveguide according to the present invention shows improved resistance against optical damage as compared with prior art waveguides, and is therefore suitable for devices subjected to incidence beam of higher intensity.

2 Claims, 1 Drawing Sheet

DIRECTION OF CRYSTAL AXES

OPTICAL WAVEGUIDE HAVING LOW OPTICAL DAMAGE

FIELD OF THE INVENTION

The present invention relates to an optical waveguide useful for optical communications as well as for optical information processing.

BACKGROUND OF THE INVENTION

Single crystals of lithium niobate (hereinafter LiNbO$_3$) in general are grown by Czochralski method in air or under a controlled gas mixture comprising 20% by volume or more of oxygen and nitrogen. These LiNbO$_3$ single crystals are advantageous in that they show large electrooptical effects, photoacoustic effects, and non-linear optical effects. Accordingly, extensive and intensive efforts have gone into development of optical devices using the LiNbO$_3$. Among them, most extensively studied are optical waveguides based on titanium-diffused crystal substrates. The LiNbO$_3$ crystals, however, suffer change in refractive index when subjected to a strong incident beam, i.e., the so-called optical damage occurs. The optical waveguides mentioned above comprising titanium-diffused crystals are also subject to such optical damage. Optical damage is undesirable to waveguides because, when the damage occurs, the refractive index of the waveguide portion approaches that of the waveguide sheath, and consequently causes the unfavorable light leakage. Concerning the mechanism of the occurrence of this optical damage, on the other hand, it is qualitatively explained as follows. That is, the carrier electrons excited from the impurity level to the conductive level by the incident beam transfer along the c axis from its negative side to the positive side for a certain distance, and are then trapped in the defects such as impurities and vacancies. As a consequence, a spatial electric field, Esc, is developed in the crystal. Thus, there is induced a change in refractive index ascribed to the above-developed spatial electric field, which corresponds to the optical damage.

The change in refractive index, Δn, of the optical waveguide induced by the optical damage explained above is expressed by $$\Delta n = -\tfrac{1}{2} n^2 \cdot r \cdot Esc \quad (1)$$

where, n represents the refractive index, r represents the electrooptical constant[cm/V], and Esc represents the spatial electric field[V/cm].

There is proposed, according to the aforementioned mechanism, two methods to reduce the optical damage. One is to add magnesium oxide to the single crystal LiNbO$_3$, and the other is to reduce the amount of the impurities incorporated into the crystal.

The former method comprises growing a crystal by Czochralski method from a LiNbO$_3$ melt added therein 5% by molar of MgO. It is reported that the resulting single crystal is improved in resistance against optical damage by about two orders of magnitude as compared with one free from additives. When an optical waveguide is produced from this single crystal diffused thereon titanium, the resulting product still suffers optical damage in the waveguide portion.

The latter method comprises reducing the content of impurities, particularly that of the transition elements such as iron, because those transition elements are considered most responsible for the optical damage. The crystals obtained in this method are, however, yet to be improved in purity.

As set forth above, there is no means up to the present to reduce the optical damage of optical waveguides produced by diffusing titanium on LiNbO$_3$ single crystal substrates.

SUMMARY OF THE INVENTION

It is an object of the present invention to provide an optical waveguide produced from a LiNbO$_3$ single crystal substrate diffused thereon titanium.

The aforementioned object is accomplished by an optical waveguide based on a lithium niobate single crystal diffused thereon titanium, wherein the lithium niobate single crystal is such having an optical absorption coefficient of 0.03 cm$^{-1}$ or less at the incidence of a light 420 nm in wavelength.

DETAILED DESCRIPTION OF THE INVENTION

Figure 1:
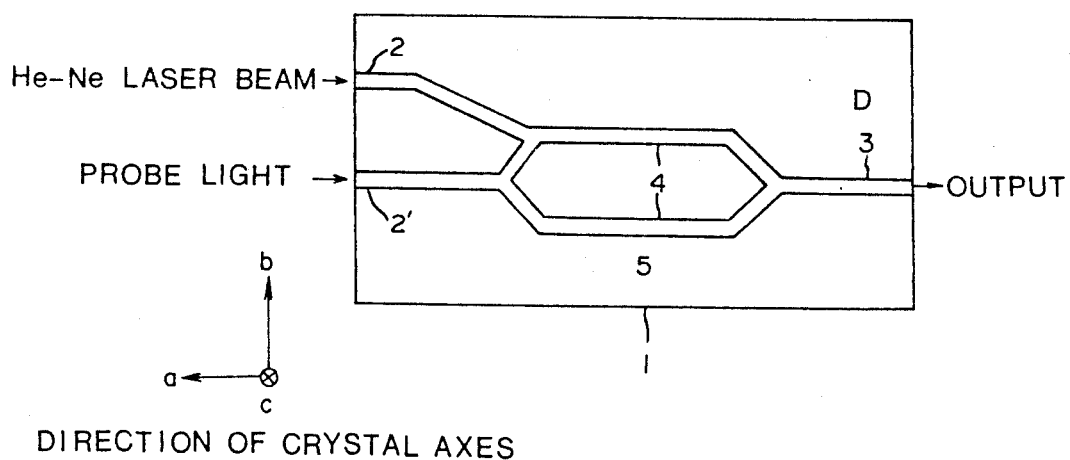
FIG. 1 is a scheme of an optical waveguide according to an embodiment of the present invention.

An embodiment according to the present invention is now explained with reference to FIG. 1, which schematically shows the structure of an waveguide formed on a substrate made from a single crystal of LiNbO$_3$. This optical waveguide is based on a substrate (1) whose longitudinal direction, the direction of the width, and the thickness direction are taken respectively in correspondence with the a-axis direction, the b-axis, and the c-axis of the single crystal, and comprises a Mach-Zehnder interferometer (5) having arms (4) of a predetermined length, provided with two input ports (2) and (2'), and an output port (3).

The LiNbO$_3$ single crystal for use in the present invention having an optical absorption coefficient of 0.03 cm$^{-1}$ with respect to a light of 420 nm in wavelength is, specifically, a LiNbO$_3$ single crystal low in Fe$^{2+}$. The reason for using such a LiNbO$_3$ single crystal resides in the fact that the degree of the optical damage is proportional to the content of Fe$^{2+}$. Since Fe$^{2+}$ most absorbs light 420 nm in wavelength, a LiNbO$_3$ single crystal low in absorption coefficient for such a light is also low in Fe$^{2+}$.

Those LiNbO$_3$ single crystals low in Fe$^{2+}$ can be prepared, for example, in a controlled atmosphere during the crystal growth, i.e., by controlling the oxygen concentration of the surrounding atmosphere.

EXAMPLE 1

A LiNbO$_3$ single crystal substantially clear and colorless was Czochralski-grown from a 99.9995% pure LiNbO$_3$ under an atmosphere the oxygen concentration of which was controlled to 10% by volume. The crystal was found to have an optical absorption coefficient for a light 420 nm in wavelength of 0.03 cm$^{-1}$. Then, a substrate 40 mm in length, 10 mm in width, and 0.5 mm in thickness was produced from this substrate in such a manner that the directions of the crystal axes a, b, and c, be respectively in correspondence with the length, width, and the thickness direction of the substrate. On this substrate was diffused titanium, to thereby form an optical waveguide as shown in FIG. 1. This optical waveguide comprises a Mach-Zehnder interferometer having an arm 16 mm in length and 7 mm in width, with two input ports (2 and 2') each 7 μm in width and $5 \times 10^{-7}$ cm² in waveguide cross section, and an output port (3) having the same width and waveguide cross section as those of the input ports. Then, a He-Ne laser beam 0.633 φm in wavelength was irradiated as an incidence beam to induce optical damage in the input port (2), while introducing into port (2') an LD light 1.3 μm in wavelength in TE mode with a proper beam intensity not capable to cause optical damage, so that this LD beam may serve as the probe beam to measure the change in refractive index ascribed to optical damage. Among the beams emitted from the output port (3), only the probe beam was modulated and detected using a lock-in amplifier to measure the output intensity of the probe beam. The output intensity of the probe beam was measured while changing the incident laser beam intensity, so as to obtain the corresponding optical damage sensitivity, $S\pi$, in accordance with the following equation (2):

$$S\pi = \lambda/2L \cdot Iir \cdot t\pi \quad (2)$$

where, $S\pi$ represents the optical damage sensitivity [cm²/J]; λ represents the wavelength of the probe beam [μm]; L represents the arm length of the interferometer [mm]; Iir represents the intensity of the laser beam irradiation [W/cm²]; and $t\pi$ represents the period of time the output intensity of the probe beam drops from its maximum to its minimum [seconds]. It was found as a result that $S\pi$ yields a constant value of $2 \times 10^{-8}$ cm²/J up to a laser beam intensity of 10 W/cm², but that it quickly increases upon exceeding that point of intensity.

In consequence, it was found that the optical waveguide according to the present invention is 5 times improved in resistance against optical damage as compared with a prior art optical waveguide.

EXAMPLE 2

An optical waveguide schematically shown in FIG. 1 was produced using a LiNbO₃ single crystal Czochralski-grown from a 99.9995% pure LiNbO₃ under an atmosphere the oxygen concentration of which was controlled to 0.1% by volume and heat-treated in air at 1100° C. for 4 hours. The heat-treated crystal was found to have an optical absorption coefficient of 0.03 cm⁻¹ in a light 420 nm in wavelength. This optical waveguide was subjected to the same test as in Example 1, to find that it has an almost constant $S\pi$ of $1 \times 10^{-8}$ cm²/J for laser beam intensity of 20 W/cm² or less, which suddenly increases with the intensity exceeding 20 W/cm².

It was found, as a result, that the resistance against optical damage of the optical waveguide according to the present invention is 10 times improved as compared with that of a prior art waveguide.

COMPARATIVE EXAMPLE

An optical waveguide schematically shown in FIG. 1 was produced from a commercially available Czochralski-grown LiNbO₃ single crystal, and was subjected to measurements for optical damage sensitivity, $S\pi$, in the same way as in the Examples above. The $S\pi$ obtained by measuring the output intensity of the probe beam while changing the incident laser beam intensity was $1 \times 10^{-7}$ cm²/J for a laser beam intensity up to 5 W/cm², which was found to quickly rise with higher intensity thereafter.

In conclusion, the optical waveguides according to the present invention show improved resistances against optical damage by five times of more as compared with the prior art waveguides, and are therefore suitable for devices subjected to incidence beam of higher intensity.

What is claimed is:

1. An optical waveguide produced from a lithium niobate single crystal substrate diffused thereon titanium, wherein, the substrate is a single crystal of lithium niobate having an optical absorption coefficient of 0.03 cm⁻¹ or less for a light 420 nm in wavelength.

2. The optical waveguide as claimed in claim 1, wherein the lithium niobate single crystal is such grown by Czochralski method from 99.9995% pure LiNbO₃ under an atmosphere the oxygen concentration of which is controlled to from 0.1 to 10% by volume.

* * * * *